United States Patent
Palomba et al.

(10) Patent No.: US 8,734,019 B2
(45) Date of Patent: May 27, 2014

(54) BEARING DEVICE, RETENTION MECHANISM AND METHOD FOR RETAINING AT LEAST ONE PAD

(75) Inventors: Sergio Palomba, Caglian (IT); Marco De Iaco, Florence (IT); Andrea Masala, Florence (IT); Anichini Alessio, Florence (IT); Grifoni Francesco, Vicchio (IT)

(73) Assignee: Nuovo Pignone S.p.A., Florence (IT)

( * ) Notice: Subject to any disclaimer, the term of this patent is extended or adjusted under 35 U.S.C. 154(b) by 330 days.

(21) Appl. No.: 12/858,154

(22) Filed: Aug. 17, 2010

(65) Prior Publication Data

US 2011/0069916 A1  Mar. 24, 2011

(30) Foreign Application Priority Data

Sep. 22, 2009   (IT) ............................... CO2009A0031

(51) Int. Cl.
*F16C 17/00* (2006.01)
*F16C 32/06* (2006.01)

(52) U.S. Cl.
USPC ............................ 384/312; 384/117; 384/119

(58) Field of Classification Search
USPC ........... 384/99, 117, 119, 306, 307, 308, 309, 384/311, 312
See application file for complete search history.

(56) References Cited

U.S. PATENT DOCUMENTS

| | | |
|---|---|---|
| 2,363,260 A | 11/1944 | Peskin et al. |
| 3,023,055 A | 2/1962 | Thompson |
| 3,131,005 A | 4/1964 | Wagley |
| 3,201,184 A | 8/1965 | Hill |
| 3,408,122 A | 10/1968 | Jeanne et al. |
| 3,572,856 A | 3/1971 | McHugh |
| 3,791,703 A * | 2/1974 | Ifield .............................. 384/117 |
| 3,887,245 A | 6/1975 | Rouch |
| 3,891,281 A | 6/1975 | Jenness |

(Continued)

FOREIGN PATENT DOCUMENTS

| | | |
|---|---|---|
| CA | 1186358 A1 | 4/1985 |
| EP | 0368558 A2 | 5/1990 |

(Continued)

OTHER PUBLICATIONS

"Low frequency shaft vibration tests and analyses", DeCamillo et al., 7th EDF & LMS Poitiers Workshop: "Operational Limits of Bearings: Improving of Performance through Modeling and Experimentation", Futuroscrope, Oct. 2, 2008, pp. H.1-H.12.

(Continued)

*Primary Examiner* — Phillip A Johnson
(74) *Attorney, Agent, or Firm* — Global Patent Operation

(57) ABSTRACT

Method, retention mechanism and bearing device for retaining at least one pad inside the bearing device. The bearing device includes a ring having at least a retaining head, at least one pad disposed inside the ring and having a bottom recess portion configured to receive the at least a retaining head, the at least one pad being configured to pivot on the at least a retaining head, and a retention mechanism configured to retain the at least one pad within a predetermined volume inside the ring. The retention mechanism is configured to apply a retaining force on the at least one pad, in addition to a force between the retaining head and the at least one pad, where the retaining force acts substantially along a radial direction of the ring, away from a center of the ring.

20 Claims, 10 Drawing Sheets

(56) References Cited

U.S. PATENT DOCUMENTS

| | | | |
|---|---|---|---|
| 3,985,405 | A | 10/1976 | Okano et al. |
| 4,291,926 | A | 9/1981 | Tomioka et al. |
| 4,322,116 | A | 3/1982 | Heinemann et al. |
| 4,323,286 | A | 4/1982 | Vohr |
| 4,568,204 | A | 2/1986 | Chambers |
| 4,699,524 | A | 10/1987 | Bath |
| 5,288,153 | A | 2/1994 | Gardner |
| 5,360,273 | A | 11/1994 | Buckmann |
| 5,547,287 | A | 8/1996 | Zeidan |
| 5,613,781 | A | 3/1997 | Kuzdzal et al. |
| 5,738,356 | A | 4/1998 | Marshall |
| 5,738,447 | A | 4/1998 | Nicholas |
| 5,743,657 | A * | 4/1998 | O'Reilly et al. ............. 384/312 |
| 6,361,215 | B1 | 3/2002 | Wilkes et al. |
| 6,588,933 | B2 | 7/2003 | Ferguson |
| 6,623,164 | B1 | 9/2003 | Gozdawa |
| 6,736,542 | B2 * | 5/2004 | Hudson ........................ 384/117 |
| 7,367,713 | B2 * | 5/2008 | Swann et al. ................. 384/308 |
| 2003/0012468 | A1 * | 1/2003 | New ............................... 384/312 |
| 2004/0240759 | A1 | 12/2004 | Swann et al. |
| 2009/0080820 | A1 | 3/2009 | Matyscak et al. |

FOREIGN PATENT DOCUMENTS

| | | |
|---|---|---|
| EP | 1 008 773 B1 | 7/2005 |
| GB | 05619 A | 0/1914 |
| JP | 55-026134 U1 | 2/1980 |
| JP | 58-207520 A | 12/1983 |
| JP | 59-004817 U1 | 1/1984 |
| JP | 01-128018 U1 | 8/1989 |
| JP | 2003-113834 A | 4/2003 |
| JP | 2009-030704 A | 2/2009 |

OTHER PUBLICATIONS

European Search Report & Written Opinion issued Dec. 6, 2010 in connection with corresponding EP Application No. 10177340.6.
U.S. Appl. No. 12/876,283, filed Sep. 7, 2010, Sergio Palomba.
JP Office Action dated Feb. 25, 2014 from corresponding JP Application No. 2010-207570, along with unofficial English translation.
JP Office Action dated Feb. 25, 2014 from related JP Application No. 2010-208731, along with unofficial English translation.

* cited by examiner

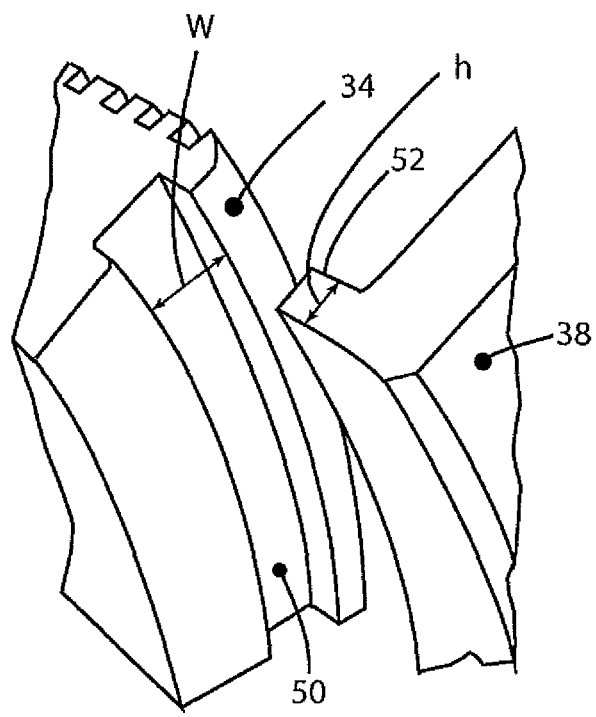
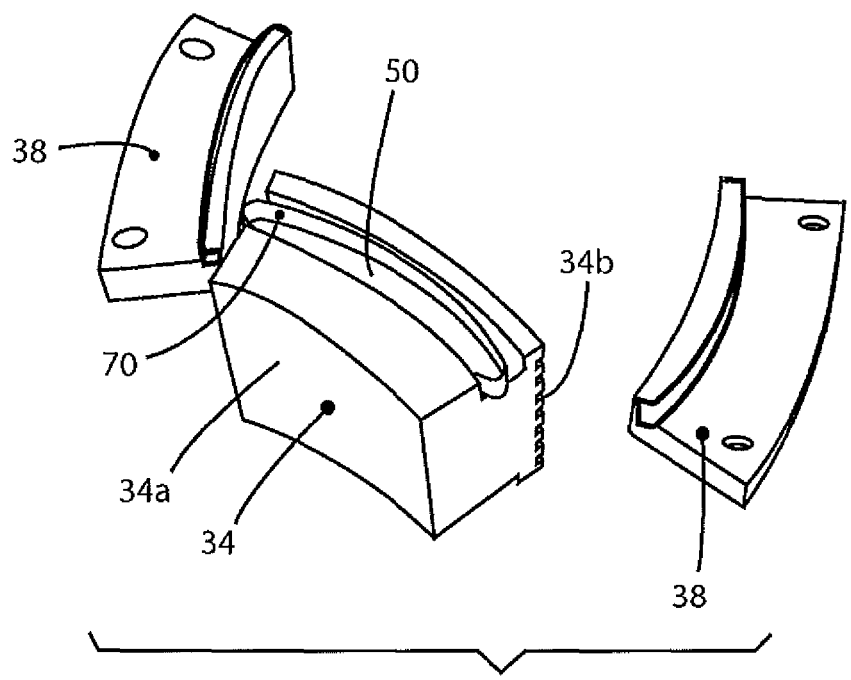

BEARING DEVICE, RETENTION MECHANISM AND METHOD FOR RETAINING AT LEAST ONE PAD

BACKGROUND OF THE INVENTION

Embodiments of the subject matter disclosed herein generally relate to methods and systems and, more particularly, to mechanisms and techniques for retaining pads within a bearing device.

Turbo machinery is evolving and the latest technology in this field is making use of high speed bearings. In many areas of bearing design, the design of the rotor-bearing system directly influences the performance of the machine. Traditional designs have provided bearings with rolling elements, i.e., pads or shoes that may pivot around a retaining head while supporting a rotor. However, at high speeds and/or high pressures, the load capacities and stiffness limits of the rolling elements are exceeded and thus, the performance and life expectancy of the machinery is reduced. For example, at peripheral speeds above the typical speed for a traditional turbo machinery, ball-bearings placed at the ends of a rotating shaft to accommodate bearing speed limits may lead to super critical (i.e., operating above critical speed) rotor design. In turn, the super critical rotor design may result in an unstable rotor which may be subject to destructive and unpreventable subsynchronous whirl and to large radial deflections.

While conventional applications of a turbo machinery employ a traditional peripheral speed, it appears that a machine that can operate at higher speeds would improve power consumption and also heat distribution in pads, among other advantages. However, these higher-than-normal speeds may contribute to other problems that are discussed next.

In order to reduce friction between a rotor and a bearing, oil may be introduced to separate the two components of the machine. In the art, this system is known as a journal bearing. The shaft and bearing are generally both simple polished cylinders with lubricant filling a gap between the shaft end and the shoes of the bearing. Rather than the lubricant just "reducing friction" between the surfaces of the shaft and the shoes, letting one slide more easily against the other, the lubricant is thick enough that, once rotating, the surfaces do not come in contact at all. If oil is used, it is generally fed into a hole in the bearing under pressure, as is done for loaded bearings.

Such an example is shown in FIG. 1, which is an illustration of FIG. 2 of U.S. Pat. No. 4,568,204, the entire content of which is incorporated herein by reference. FIG. 1 shows the journal bearing 10 enclosing a shaft 12 that rotates as shown by arrow 14. Journal bearing 10 includes five pads 16 that are retained in place by a ring 18. Each pad 16 includes a pad support 20 inserted into a recess region 22 of the pad 16. The pad support 20 is connected to an insert 24 that is fixed to the ring 18. Each pad support 20 and recess region 22 have cooperating spherical surfaces to allow the pad 16 to pivot freely in any direction to conform to the surface of the shaft 12 as it rotates. In addition, the journal bearing 10 has oil supply devices 26 regularly formed inside the ring 18 for supplying the oil between pads 16 and shaft 12.

However, when shaft 12 rotates relative to the pads 16 with a speed of 80 m/s, oil starvation is one of the problems found in traditional turbo machinery. This problem is exacerbated when the peripheral shaft speed is increased. Oil starvation is the lack of enough oil for the rotating shaft and/or pads such that the oil film between the shaft and the pads is interrupted, which may lead to high friction between the shaft and pads, leading to high temperature and subsequent damage.

Another problem that may appear in traditional turbo machinery is cavitation. Cavitation is the formation of vapor bubbles of a flowing liquid (oil for example) in a region where the pressure of the liquid falls below its vapor pressure. As the rotor rotates with a high speed, the pressure of the oil may fall below its vapor pressure, leading to cavitation and formation of shock waves. Since the shock waves formed by cavitation are strong enough to significantly damage moving parts, cavitation is usually an undesirable phenomenon.

As the peripheral shaft speed of new applications require speeds in excess of 170 m/s, the above summarized problems have to be addressed and solved in order for these applications to function appropriately. While the above problems have been discussed in the context of journal bearings, these problems are found in other bearings in which the shaft rotates relative to the pads at high speeds.

Accordingly, it would be desirable to provide devices, systems and methods that avoid the afore-described problems and drawbacks as well as others understood by those of ordinary skill after consideration of the subject matter disclosed below.

BRIEF SUMMARY OF THE INVENTION

According to one exemplary embodiment, there is a bearing device that includes a ring having at least a retaining head, at least one pad disposed inside the ring and having a bottom recess portion configured to receive the at least a retaining head, the at least one pad being configured to pivot on the at least a retaining head, and a retention mechanism configured to retain the at least one pad within a predetermined volume inside the ring.

According to another exemplary embodiment, there is a retention mechanism for retaining at least one pad inside a predetermined volume inside a bearing device. The retention mechanism is configured to contact the at least one pad and the bearing device and to apply a retaining force on the at least one pad in addition to a force between the at least one pad and a retaining head holding the at least one pad in a ring of the bearing device. The retaining force acts substantially along a radial direction of the ring of the bearing device away from a center of the ring.

According to still another exemplary embodiment, there is a method for retaining at least one pad within a predetermined volume inside a ring of a bearing device. The method includes a step of disposing the at least one pad on a retaining head oldie ring such that a bottom recess portion of the at least one pad is configured to receive the retaining head, the at least one pad being configured to pivot on the retaining head; a step of retaining the at least one pad with a retention mechanism that is configured to retain the at least one pad within the predetermined volume inside the ring; and a step of configuring the retention mechanism to apply a retaining force on the at least one pad when the bearing device is in use in addition to a force between the retaining head and the at least one pad, the retaining force acting substantially along a radial direction of the ring away from a center of the ring.

BRIEF DESCRIPTION OF THE DRAWINGS

The accompanying drawings, which are incorporated in and constitute apart of the specification, illustrate one or more embodiments and, together with the description, explain these embodiments. In the drawings:

FIG. 5 is a perspective view of the pad of FIG. 4 according to an exemplary embodiment;

FIG. 7 is a perspective view of a pad and a spring according to an exemplary embodiment;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of journal bearings. However, the embodiments to be discussed next are not limited to these structures and systems, but may be applied to other bearings and systems that include a shaft or rotor that rotates and is supported by pads.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
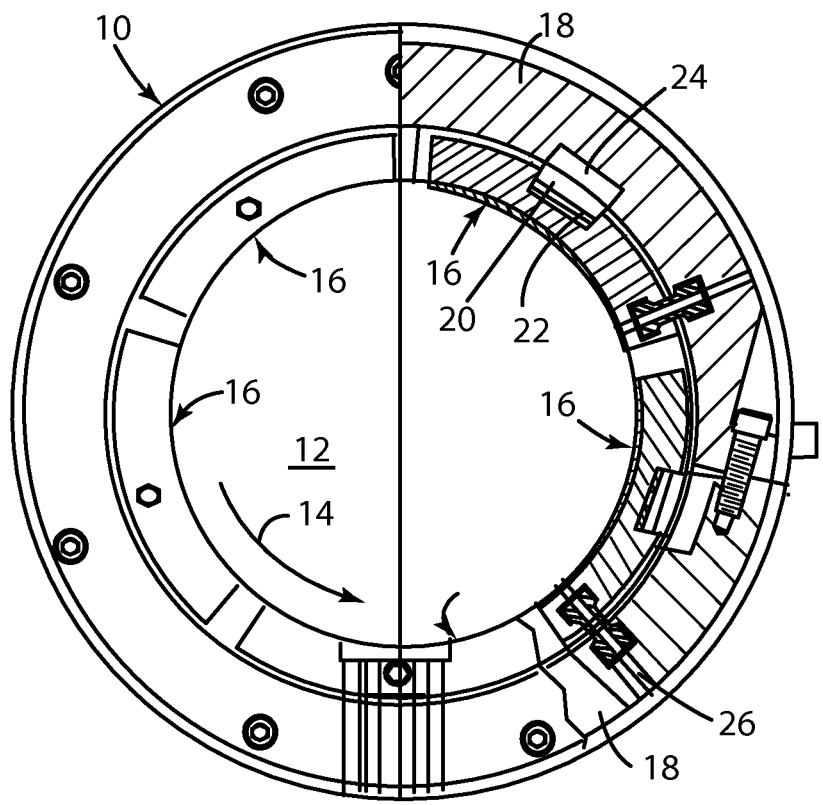
FIG. 1 is a schematic diagram of a conventional journal bearing.
Figure 2:
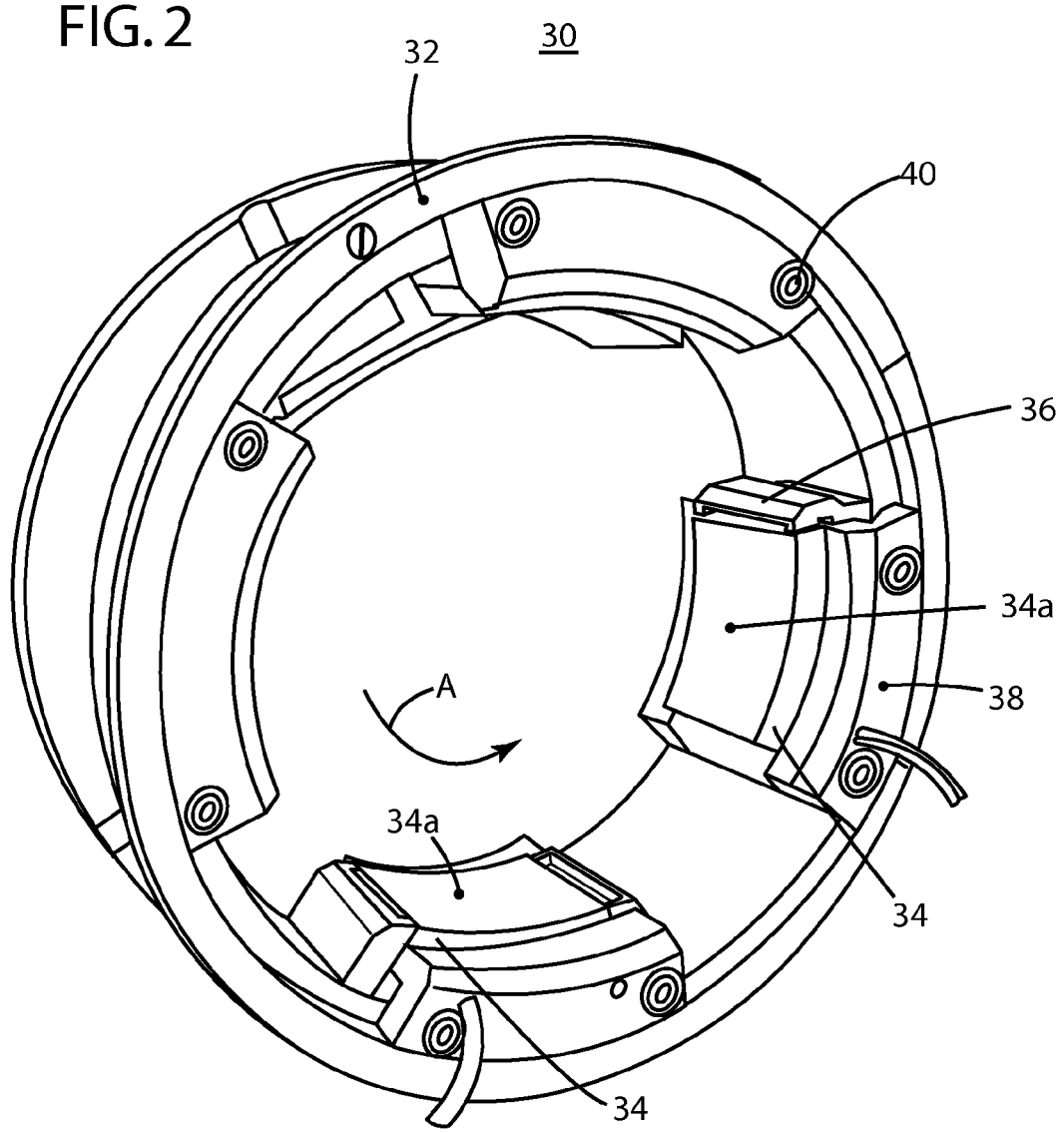
FIG. 2 is a schematic diagram of a journal bearing according to an exemplary embodiment.

According to an exemplary embodiment shown in FIG. 2, a journal bearing 30 includes a ring 32 that is configured to hold plural pads 34, each having a working surface 34a. The pads 34 are retained by a blocking plate 36 to prevent them from sliding in a rotational direction A when a shaft (not shown) rotates at high speeds (for example between 100 and 170 m/s) in direction A. Corresponding retention plates 38, for preventing axial dislocation, retain the pads 34 in the proximity of ring 32. The retention plates 38 are shown in FIG. 2 as being fixed to the ring 32 by screws 40. In other applications, the retention plates 38 may be fixed by other ways to the ring 32, as would be recognized by those skilled in the art. The ring 32, the blocking plate 36 and the retention plates 38 define a predetermined volume in which the pad 34 may pivot about a retaining head.

Figure 3:
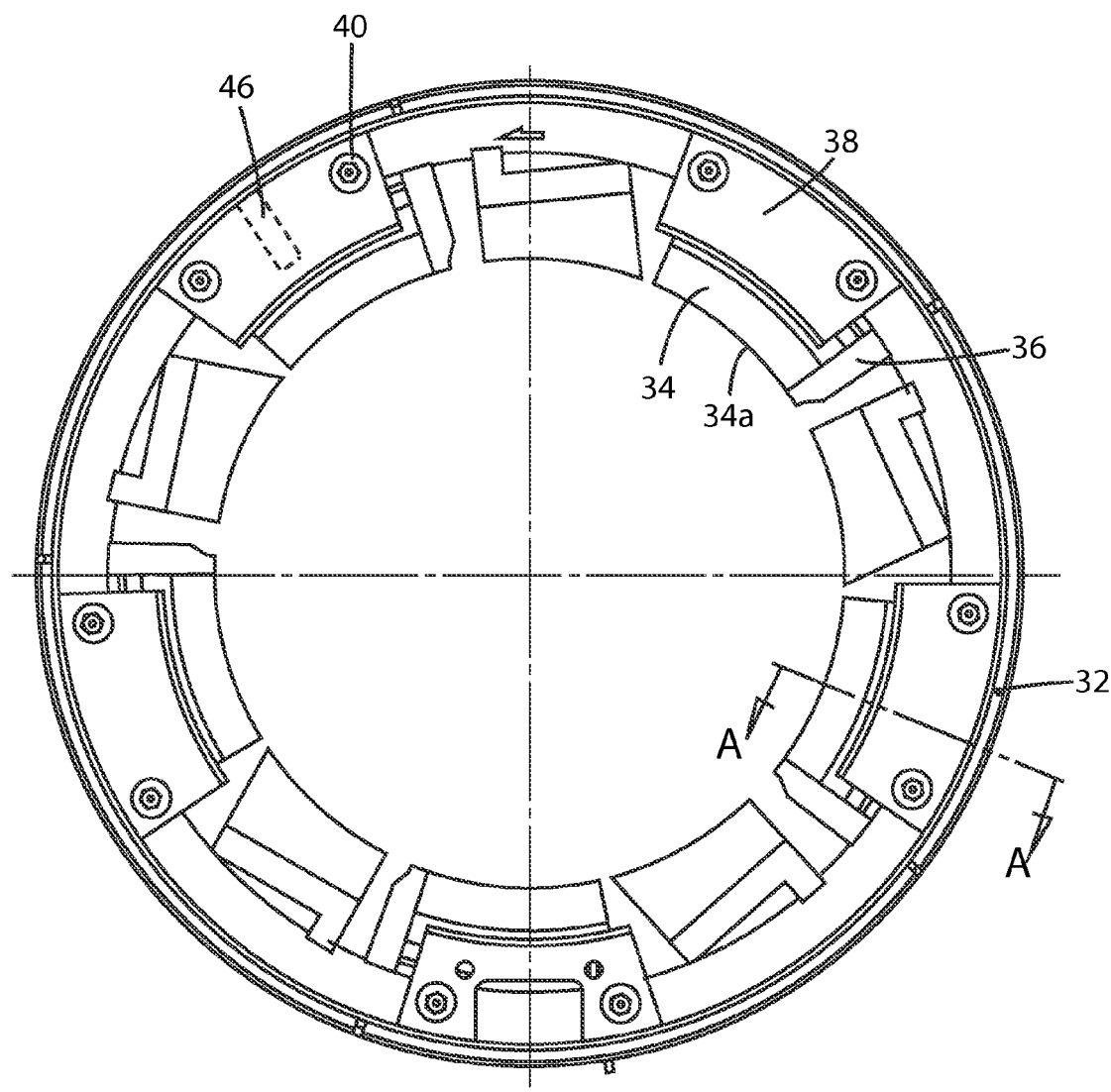
FIG. 3 is a transversal view of the journal bearing of FIG. 2 according to an exemplary embodiment.
Figure 4:
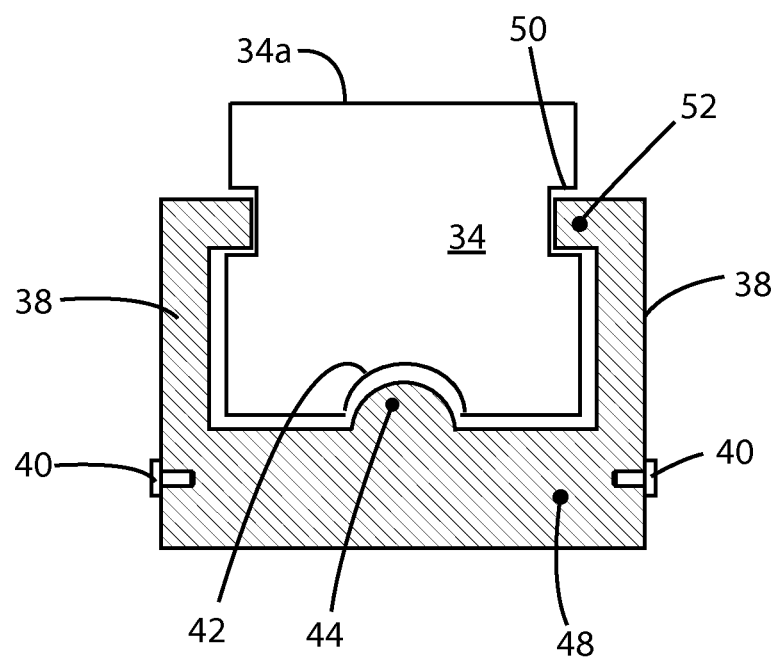
FIG. 4 is a cross section through a pad of a journal bearing according to an exemplary embodiment.

FIGS. 3 and 4 show that each pad 34 has a recess portion 42 in which the retaining head 44 is provided. The retaining head 44 is fixed to the ring 32 by a screw 46. The recess portion 42 is shaped in such a way that the pad 34 is allowed to pivot relative to the retaining head 44. These elements are also shown in FIG. 4, which is a cross section along line A-A of FIG. 3. The pad 34 is shown in FIG. 4 disposed on a supporting element 48. The retaining head 44 is either attached to the supporting element 48 (as shown in FIG. 3) or formed as part of the supporting element 48 (as shown in FIG. 4). The recess portion 42 of the pad 34 is configured to receive the retaining head 44. Two retention plates 38 are attached with screws 40 to the supporting element 48. The supporting element 48 may be part of ring 32 or attached to ring 32. FIG. 4 also shows two grooves 50 formed on sides of the pad 34. The grooves 50 are configured to receive protrusions 52 of the retention plates 38.

FIG. 5 shows in more detail a connection formed between the pad 34 and the retention plate 38. The groove 50 is formed to have a width "w" larger than a height "h" of the protrusion regions 52. In one application, the width w is at least 10% larger than the height h. In this way, the pad 34 is still able to pivot around retaining head 44 while protrusion regions 52 engage grooves 50.

Figure 6:
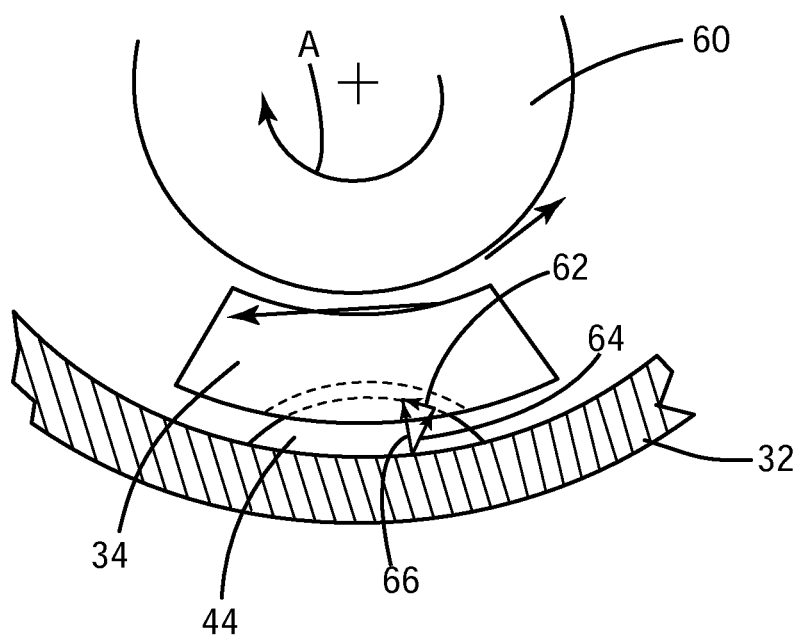
FIG. 6 is a schematic diagram of a rotor that is supported by a journal bearing according to an exemplary embodiment.

As it has been discussed in the Background section, oil starvation and bearing instability are known problems that affect traditional bearings. One cause of oil starvation in traditional bearings and bearing instability at high rotor speeds is the magnitude of a dislocation force exerted on the pads 34. This dislocation force is discussed next with regard to FIG. 6. FIG. 6 shows a rotor 60 rotating with a certain speed n (revolutions per second) along direction A. The rotor 60 is supported by the pad 34. At least two forces occur when the rotor 60 rotates at high speeds. A first force is a friction force, caused by the friction between the pad 34 and the oil (which is placed in motion by the rotating shaft), and a second force is a pressure force, caused by a side pressure generated by the oil around the pad while the shaft rotates. A resultant of these two forces is shown in FIG. 6 as force 66. The force 66 may be decomposed into a first force component 62, tangential to the retaining head 44, and a second force component 64, which is normal to the pivot ball 44. This second force component 64 is a dislocating force that acts to remove the pad 34 from the retaining head 44.

According to an exemplary embodiment shown in FIG. 7, a spring 70 may be provided on at least one of the protrusion regions 52 of the retention plates 38. In one application, the spring 70 may be fixed to the pad 34. However, in another application, the spring 70 may be fixed to the retention plate 38. The spring 70 may be configured to balance the dislocating force 64, i.e., a force exerted by the spring 70 on the pad 34, from the rotor 60 towards the ring 32, may be substantially equal in magnitude and opposite direction to the dislocating force 64. In one exemplary embodiment, the force exerted by the spring 70 may be larger than the dislocating force 64, for example, between 100% and 200% of the dislocating force 64.

Figure 8:
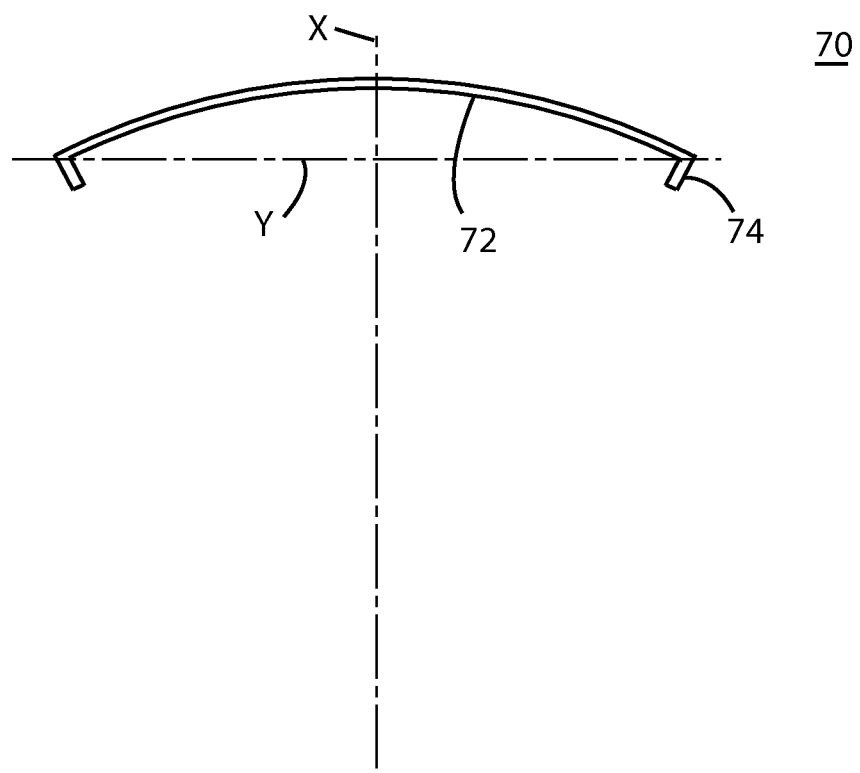
FIGS. 8 and 9 are schematic diagrams of a spring according to an exemplary embodiment.
Figure 9:
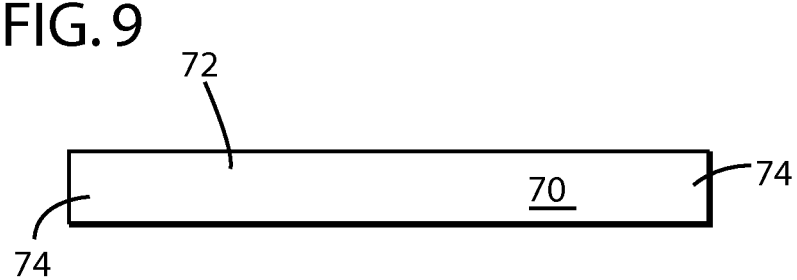

Springs 70 may be provided in each groove 50, disposed on each protrusion region 52 of the retention plates 38. The springs 70 may have the form showed in FIG. 8. The springs 70 may include a body 72 that has a shape similar to an arc and two end regions 74 that help to attach/fix the spring 70 to the corresponding retention plate 38. The springs 70 also allow the pad 34 to tilt around the retaining head 44. In one application, the spring 70 may have an X axis crossing a middle of the spring as shown in FIG. 8 and a Y axis intersecting the X axis and also the interface between the body 72 and the end regions 74. In an exemplary embodiment, the cord length of the body 72 is between 30 and 45 degrees. FIG. 9 shows a top view of the spring 70. In one application, the spring is made of a material that exhibits flexibility and acts as a spring, thus having a spring constant k. For example, the spring 70 may be made of C7D or other steel alloy for springs, i.e. SiNiCr5, and may have a hardness of 40 to 50 HRC on the Rockwell scale (the Rockwell test determines the hardness by measuring the depth of penetration of an indenter under a large load compared to the penetration made by a preload).

In an exemplary embodiment, the spring 70 has the end regions 74 (see FIG. 8) attached to the protrusion regions 52 of the retention plates 38, as shown in FIG. 7. However, a central part of the body 72 of the spring 70 is configured to touch the pad 34 but not the protrusion regions 52 as shown in FIG. 7.

Figure 10:
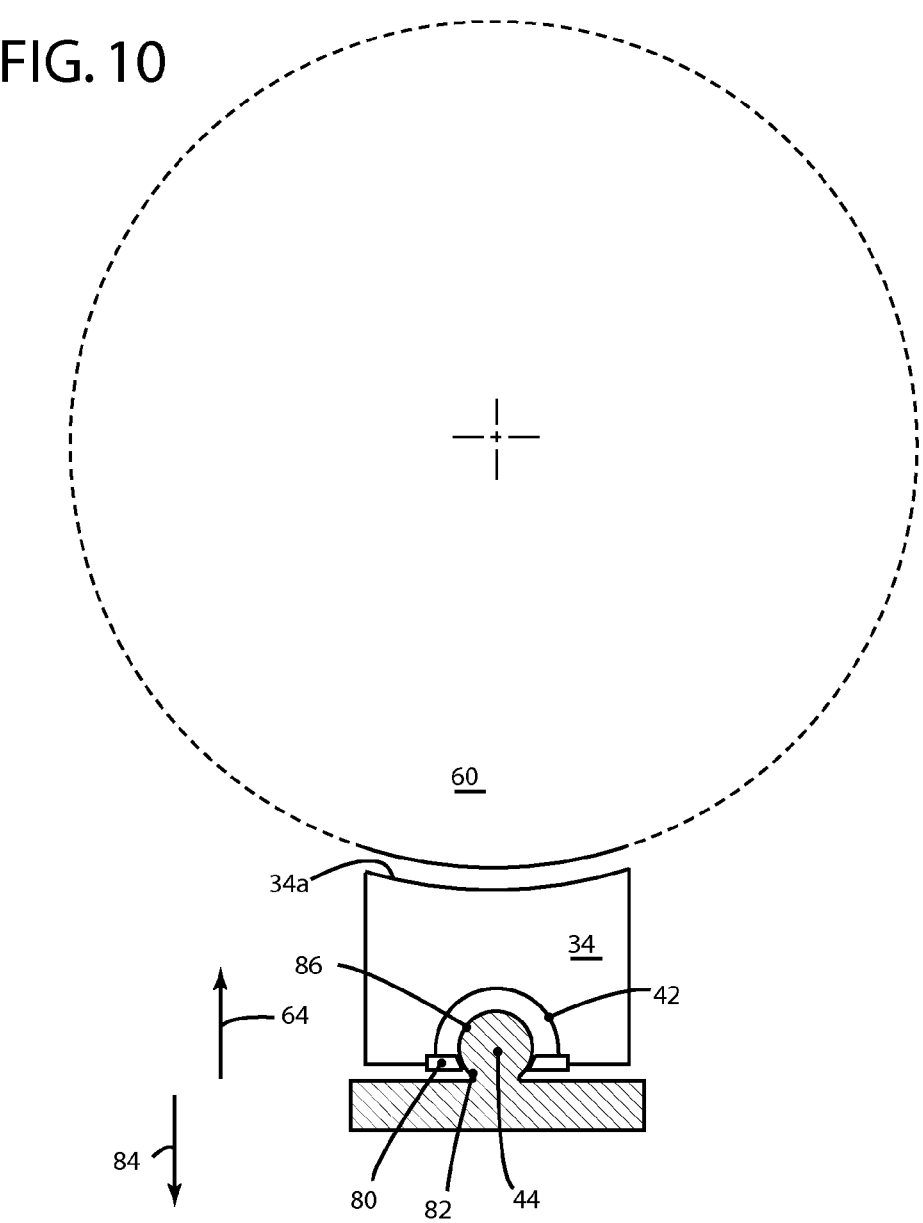
FIGS. 10 and 11 are different views of a collar attached to a pad according to an exemplary embodiment.
Figure 11:
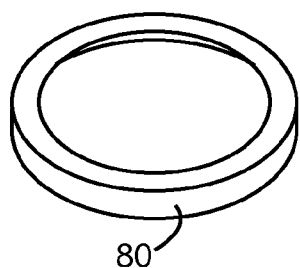

According to another exemplary embodiment illustrated in FIG. 10, a collar 80 may be attached to the pad 34, around a neck portion 82 of the retaining head 44 for providing a retaining force 84 that cancels out the dislocating force 64 when rotor 60 is rotating at high speed. It is noted that according to this embodiment, a radius of the neck portion 82 is smaller than a radius of a head portion 86 of the retaining head 44, thus preventing the collar 80 from coming out of the retaining head 44. The collar 80 may be initially mounted around the neck portion 82 through various techniques, for example, heating the collar 80 to fit over the head portion 86 or making the collar 80 of two halves that are connected (welded) together after being placed around the neck portion 82. A top view of the collar 80 is shown in FIG. 11. The collar 80 may be formed of steel or other strong material. The collar 80 may be screwed into the pad 34, welded to the pad 34 or attached in other ways that are known by those skilled in the art.

Figure 12:
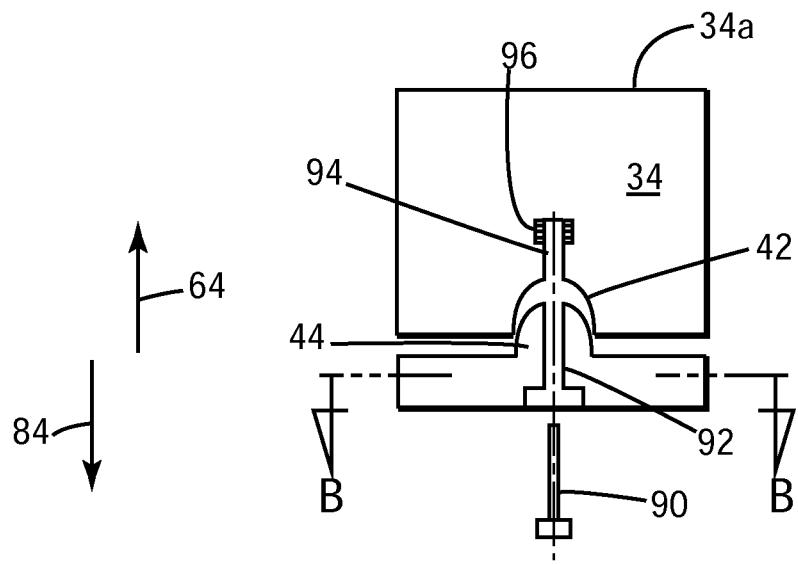
FIGS. 12 and 13 are different views of a retention mechanism of a pad according to an exemplary embodiment.
Figure 13:
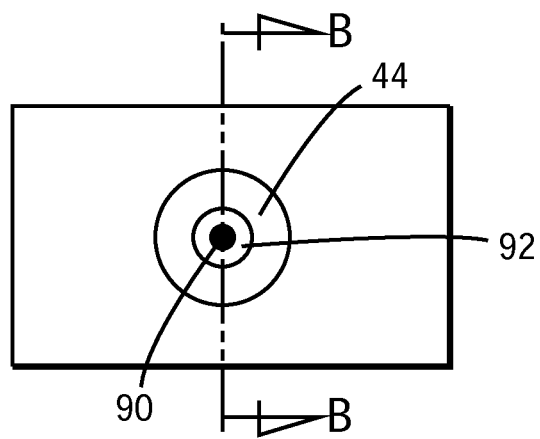

According to another exemplary embodiment illustrated in FIG. 12, the pad 34 may be retained in a predetermined volume inside the ring 32 by a fastener element 90 that is inserted through a hole 92 made in the retaining head 44 and a hole 94 made in a central region of the pad 34. Fastener 90 may be a traditional screw, a bolt, a threaded element, etc. as would be recognized by those skilled in the art. The hole 94 has threads 96 at least towards an end portion of the hole 94 for engaging with corresponding threads of the fastener 90. For allowing the pad 34 to tilt relative to the retaining head 44, the hole 92 in the retaining head 44 is oversized, i.e., a radius of the hole 92 is larger than a radius of the fastener 90. FIG. 13 shows a view (along line B-B in FIG. 12) of the fastener 90 when inserted in hole 92. Thus the dislocating force 64 produced by the rotation of the rotor 60 is balanced by the retaining force 84 that occurs between the pad 34 and the fastener 90.

It is noted that any combination of features of the exemplary embodiments shown in FIGS. 7, 11 and 13 may be used in a same bearing system.

Figure 14:
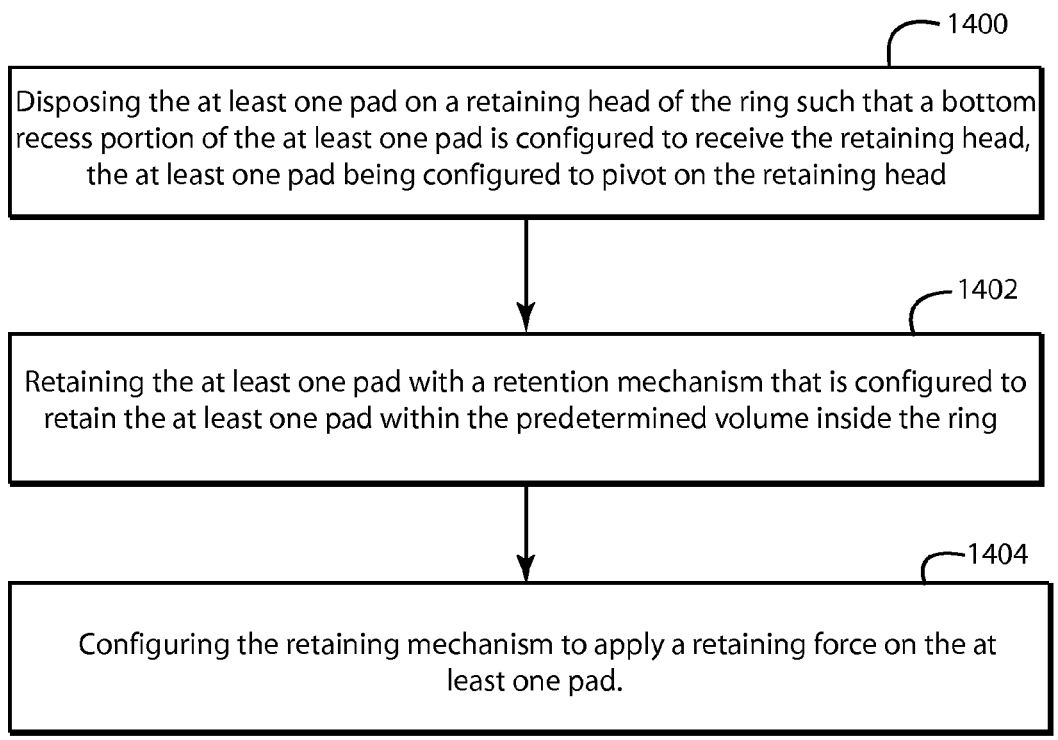
FIG. 14 is a flow chart illustrating steps of a method for retaining a pad according to an exemplary embodiment.

According to an exemplary embodiment illustrated in FIG. 14, there is a method for retaining at least one pad within a predetermined volume inside a ring of a bearing device. The method includes: a step 1400 of disposing the at least one pad on a retaining head of the ring such that a bottom recess portion of the at least one pad is configured to receive the retaining head; the at least one pad being configured to pivot on the retaining head, a step 1402 of retaining the at least one pad with a retention mechanism that is configured to retain the at least one pad within the predetermined volume inside the ring; and a step 1404 of configuring the retaining mechanism to apply a retaining force on the at least one pad when the bearing device is in use, in addition to a force between the retaining head and the at least one pad, wherein the retaining force acts substantially along a radial direction of the ring, away from a center of the ring.

The disclosed exemplary embodiments provide a bearing device, a retention mechanism and a method for retaining at least one pad within a predetermined volume inside a ring of a bearing device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A bearing device comprising:
   a ring having a center and at least a retaining head;
   wherein the ring is configured to hold at least one pad inside the ring, the pad having a bottom recess portion configured to receive the retaining head, the pad being configured to pivot on the retaining head; and
   a retention mechanism including (i) first and second type plates configured to retain the pad within a predetermined volume inside the ring and (ii) a biasing device configured to apply, when the biasing device is engaged to the retaining head, a retaining force on the pad, the retaining force being in a redial direction of the ring and away from the center of the ring.

2. The bearing device of claim 1, wherein the first and second type plates respectively include (i) retention plates having protrusions configured to fit in grooves associated with the pad and (ii) a blocking plate.

3. The bearing device of claim 2, wherein the protrusions extend along a side of the retention plates and have a height smaller than a width of the side grooves of the at least one pad such that the at least one pad is able to pivot on the at least a retaining head, and
   the biasing device includes springs disposed on the retention plates and configured to apply a biasing force on sides of the side grooves of the at least one pad.

4. The bearing device of claim 3, wherein the springs are shaped such that end portions of the springs are configured to be attached to the protrusions of the retention plates and a central region of the springs is configured to touch the at least one pad but not the protrusions of the retention plates.

5. The bearing device of claim 3, wherein the springs are configured to produce the retaining force to be equal or larger than a dislocating force, wherein the dislocating force is produced at least by a rotation relative to the at least one pad or oil pressure and the dislocating force is substantially along a radial direction of the ring, acting towards the center of the ring.

6. The bearing device of claim 1, wherein the retention mechanism comprises:
a collar formed around a neck of the retaining head and configured to be attached to the at least one pad such that a dislocating force acting on the at least one pad is decreased by the retaining force between the collar and the retaining head.

7. The bearing device of claim 6, wherein the collar is configured to be screwed into the at least one pad.

8. The bearing device of claim 1, wherein the retaining mechanism comprises:
a fastener to be disposed through an oversized hole of the retaining head and attached to a region of the bottom recess portion of the at least one pad, wherein the fastener is configured to move inside the oversized hole such that the at least one pad pivots around the retaining head when the fastener is screwed into the at least one pad.

9. The bearing device of claim 8, wherein the fastener is configured such that a dislocating force acting on the at least one pad is decreased by the retaining force between the fastener and the retaining head.

10. A bearing device comprising:
a ring having at least a retaining head;
at least one pad disposed inside the ring and having a bottom recess portion configured to receive the at least a retaining head, the at least one pad being configured to pivot on the retaining head; and
a retention mechanism configured to retain the at least one pad within a predetermined volume inside the ring and to apply a retaining force on the at least one pad, in addition to a force between the retaining head and the at least one pad, wherein the retaining force acts substantially along a radial direction of the ring, away from a center of the ring, wherein
the retention mechanism includes two or more of,
(i) the retention plates having protrusions configured to fit inside grooves of the at least one pad, and
springs disposed on the retention plats and configured to press on sides of the side grooves of the at least one pad for generating the retaining force,
(ii) a collar formed around a neck of the at least a retaining head and configured to be attached to the at least one pad, and
(iii) a fastener configured to be disposed through an oversized hole of the at least a retaining head and attached to a region of the bottom recess portion of the at least one pad, wherein
the fastener is configured to move inside the oversized hole such that the at least one pad pivots around the at least a retaining head when the fastener is screwed into the at least one pad.

11. A retention mechanism for retaining at least one pad inside a predetermined volume inside a bearing device, the retention mechanism, comprising:
first and second type plates configured to contact the pad and the bearing device; and
a biasing device configured to apply a retaining force on the pad and a retaining head holding the at least one pad in a ring of the bearing device, wherein the retaining force acts substantially along a radial direction of the ring of the bearing device, away from a center of the ring.

12. The retention mechanism of claim 11,
wherein the first type plates include plates having protrusions configured to fit inside grooves of the pad, the protrusions extending along a side of the retention plates and have height smaller than a width of the side grooves of the pad such that the pad is able to pivot on the retaining head attached to the ring, and
wherein the biasing device includes springs disposed on the retention plates and configured to apply a biasing force on sides of the side grooves of the pad.

13. The retention mechanism of claim 12, wherein the springs are shaped such that end portions of the springs are configured to be attached to protrusions of the retention plates and a central region of the springs is configured to touch the at least one pad but not the protrusions of the retention plates.

14. The retention mechanism of claim 12, wherein the dislocating force if produced at least by a rotation of a rotor relative to the at least one pad or oil pressure and the dislocating force is substantially along the radial direction of the ring, acting towards the center of the ring.

15. The retention mechanism of claim 11, further comprising:
a collar formed around a neck of the retaining head and configured to be attached to the at least one pad such that a dislocating force acting on the at least one pad is decreased by the retaining force between the collar and the retaining head.

16. The retention mechanism of claim 15, wherein the collar is configured to be screwed into the at least one pad.

17. The retention mechanism of claim 11, further comprising:
a fastener to be disposed through an oversized hole of the retaining head and attached to a bottom region of the at least one pad, wherein
the fastener is configured to move inside the oversized hole such that the at least one pad around the retaining head when the fastener is screwed into the at least one pad.

18. A method for retaining at least one pad within a predetermined volume inside a ring of a bearing device, the method comprising:
disposing the pad on a retaining head of the ring such that a bottom recess portion of the pad is configured to receive a retaining head, the pad being configured to pivot on the retaining head;
retaining the at least one pad with a retention mechanism including first and second type plates and a biasing device that is configured to retain the at least one pad within the predetermined volume inside the ring; and
configuring the biasing device to apply a retaining force on the pad when the bearing device is engaged to the retaining head, the retaining force being in a redial direction of the ring and away from the center of the ring.

19. The method of claim 18, further comprising:
configuring the retaining mechanism to include retention plates having protrusions configured to fit inside grooves of the at least one pad, and
applying springs on the retention plates to press on sides of the side grooves of the at least one pad for generating the retaining force.

20. The method of claim 18, further comprising:
configuring the retaining mechanism to include a collar formed around a neck of the retaining head, the collar being attached to the at least one pad; and/or
configuring the retaining mechanism to include a fastener to be disposed through an oversized hole of the retaining head into a region of the bottom recess portion of the at least one pad such that the fastener moves inside the oversized hole such that the at least one pad pivots around the retaining head.

* * * * *